US012578052B2

(12) United States Patent
Liu

(10) Patent No.: US 12,578,052 B2
(45) Date of Patent: Mar. 17, 2026

(54) COMPRESSOR ANTICOLLISION STRUCTURE AND ELECTRICAL DEVICE

(71) Applicants: GD MIDEA AIR-CONDITIONING EQUIPMENT CO., LTD., Foshan (CN); MIDEA GROUP CO., LTD., Foshan (CN)

(72) Inventor: Fashen Liu, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 227 days.

(21) Appl. No.: 18/031,553

(22) PCT Filed: Oct. 27, 2021

(86) PCT No.: PCT/CN2021/126745
§ 371 (c)(1),
(2) Date: Apr. 12, 2023

(87) PCT Pub. No.: WO2022/089489
PCT Pub. Date: May 5, 2022

(65) Prior Publication Data
US 2023/0375126 A1 Nov. 23, 2023

(30) Foreign Application Priority Data

Oct. 29, 2020 (CN) .......................... 202022452441.9
Nov. 5, 2020 (CN) .......................... 202022534870.0

(51) Int. Cl.
*F16M 11/22* (2006.01)
*F16M 1/00* (2006.01)
(52) U.S. Cl.
CPC .............. *F16M 11/22* (2013.01); *F16M 1/00* (2013.01)

(58) Field of Classification Search
CPC ....... F16M 11/22; F16M 1/00; F04B 39/0027; F04B 39/0044; F04B 39/121; F04B 39/127; F04B 39/00; F16F 1/3732
(Continued)

(56) References Cited

U.S. PATENT DOCUMENTS

| | | | |
|---|---|---|---|
| 4,676,473 A | 6/1987 | Giles | |
| 2015/0204328 A1 | 7/2015 | Tozawa | |

FOREIGN PATENT DOCUMENTS

| | | |
|---|---|---|
| CN | 201148721 Y | 11/2008 |
| CN | 201672634 U | 12/2010 |
(Continued)

OTHER PUBLICATIONS

World Intellectual Property Organization (WIPO) International Search Report and Written Opinion for PCT/CN2021/12674 Jan. 26, 2022 15 Pages (with translation).
(Continued)

*Primary Examiner* — Kimberly T Wood
(74) *Attorney, Agent, or Firm* — Anova Law Group, PLLC

(57) ABSTRACT

A compressor anticollision structure includes a support assembly including a chassis, a compressor assembly provided at the chassis and including a compressor, and an anticollision strip connected to the support assembly. A head end of the anticollision strip is connected to a tail end of the anticollision strip to surround the compressor, or two opposite ends in a length direction of the anticollision strip are connected to the support assembly and the compressor is located in an area enclosed by the anticollision strip and the support assembly.

13 Claims, 13 Drawing Sheets

(58) Field of Classification Search
USPC ........................................ 248/634, 638, 674
See application file for complete search history.

(56)                          References Cited

FOREIGN PATENT DOCUMENTS

| CN | 105276073 | B | | 1/2016 |
| CN | 205783398 | U | | 12/2016 |
| CN | 107388419 | A | | 11/2017 |
| CN | 108592242 | A | | 9/2018 |
| CN | 108715120 | A | | 10/2018 |
| CN | 110630854 | A | * | 12/2019 |
| CN | 110645163 | A | * | 1/2020 |
| CN | 211009011 | U | * | 7/2020 |
| CN | 214196593 | U | | 9/2021 |
| CN | 214405374 | U | | 10/2021 |
| JP | 2017053476 | A | | 3/2017 |
| KR | 100438613 | B1 | * | 7/2004 |
| KR | 20040077234 | A | * | 9/2004 |

OTHER PUBLICATIONS

The European Patent Office (EPO) Communication pursuant to Rules 70(2) and 70a(2) EPC U.S. Appl. No. 21885216.8 Apr. 8, 2024 10 Pages.

* cited by examiner

13(34)

31a(12a)

31

431

432

432a

431

432

432a

COMPRESSOR ANTICOLLISION STRUCTURE AND ELECTRICAL DEVICE

CROSS-REFERENCE TO RELATED APPLICATIONS

This application is a National Stage Entry under 35 U.S.C. § 371 of International Application No. PCT/CN2021/126745, filed on Oct. 27, 2021, which claims priority to Chinese Patent Application No. 202022452441.9, filed on Oct. 29, 2020, and Chinese Patent Application No. 202022534870.0, filed on Nov. 5, 2020, the entire contents of which are incorporated herein by reference.

TECHNICAL FIELD

The present disclosure relates to the technical field of electrical devices, in particular to a compressor anticollision structure and an electrical device.

BACKGROUND

Electrical device, such as air conditioner outdoor unit and dehumidifier, is usually provided with a compressor. But as the product is designed to be more and more compact, the spatial structure around the compressor is excessively compressed, resulting in a relatively small distance between the compressor and external components and/or other internal components of the electrical device. In some cases, such as when the electrical device shakes violently or falls down during transportation, the compressor is likely to hit the external components and/or other internal components, resulting in damage to the external components and/or other internal components.

SUMMARY

In view of this, the main objective of embodiments in the present disclosure is to provide a compressor anticollision structure and an electrical device with good anticollision effects.

In order to achieve the above objectives, embodiments of the present disclosure provides a compressor anticollision structure, applied in an electrical device, including:

a support assembly includes a chassis;

a compressor assembly provided at the chassis, and the compressor assembly includes a compressor; and an anticollision strip connected to the support assembly, a head end of the anticollision strip is connected to a tail end of the anticollision strip to surround a periphery of the compressor, or two opposite ends in a length direction of the anticollision strip are connected to the support assembly, and the compressor is located in an area enclosed by the anticollision strip and the support assembly.

In an embodiment, the anticollision strip includes a strip-shaped force-bearing body;

the anticollision strip further includes a first flexible protection strip provided at a side of the strip-shaped force-bearing body away from the compressor; and/or the anticollision strip further includes a second flexible protection strip provided at a side of the strip-shaped force-bearing body facing the compressor.

In an embodiment, the support assembly includes a middle partition provided at the chassis, and the anticollision strip includes the strip-shaped force-bearing body, and two opposite ends in a length direction of the strip-shaped force-bearing body are fastened to the middle partition.

In an embodiment, the anticollision strip further includes at least two first positioning members, and each of the two opposite ends in the length direction of the strip-shaped force-bearing body is provided with at least one of the two first positioning members, the support assembly further includes at least two second positioning members provided at the middle partition, and one of the first positioning member and the second positioning member is a positioning hole, another of the first positioning member and the second positioning member is a positioning pillar, and a positioning pillar is inserted in a corresponding positioning hole.

In an embodiment, the support assembly includes a middle partition provided at the chassis, and the middle partition includes a plate body and at least one enhanced boss protruding from a side of the plate body away from the compressor, the plate body is provided at the chassis, and the enhanced boss extends along a height direction of the plate body.

In an embodiment, the middle partition includes a first portion and a second portion along a height direction of the middle partition, the second portion is provided at a top side of the first portion, a continuous stepped surface is formed in a junction between a side of the first portion away from the compressor and a side of the second portion away from the compressor, the continuous stepped surface extends along a lateral direction of the middle partition and departs from the chassis, and a part of the enhanced boss is provided at the first portion of the middle partition, and another part of the enhanced boss is provided at the second portion of the middle partition.

In an embodiment, the compressor assembly further includes a support plate at a bottom of the compressor, the compressor anticollision structure includes a fixation assembly, the fixation assembly includes a support pillar and a cushion pad, a bottom of the support pillar is connected to the chassis, and the cushion pad is sleeved outside the support pillar, and the support plate is sleeved outside the cushion pad and is spaced apart from the support pillar and a top of the cushion pad has a free movement stroke along an axial direction of the cushion pad.

In an embodiment, a bottom of the cushion pad is engaged with the support pillar by an interference fit, and a top of the cushion pad is engaged with the support pillar by a loose fit.

In an embodiment, the fixation assembly further includes a gasket and a nut threadedly connected to the support pillar, the cushion pad is located between the chassis and the gasket, an abutment surface is formed at the support pillar, and the nut abuts the gasket on the abutment surface, the gasket is spaced apart from the cushion pad and the support plate along an axial direction of the support pillar, to make the top of the cushion pad have the free movement stroke along the axial direction of the cushion pad.

In an embodiment, a minimum distance H1 between the cushion pad and the gasket is 0.5 mm to 3 mm along an axial direction of the support pillar.

In an embodiment, the nut and the gasket are separated and fastened to each other; or the nut and the gasket are integrated.

In an embodiment, a folded edge folding towards the chassis is formed at the gasket, and an accommodation space is enclosed by the folded edge, an end of the cushion pad away from the chassis extends into the accommodation space, the folded edge is configured to face the support plate, and a distance H2 between a bottom surface of the folded edge and a top surface of the support plate is 0.5 mm to 3 mm.

In an embodiment, a stepped hole is formed at the chassis, the stepped hole includes an installation sub-hole and a non-circular sub-hole at a bottom side of the installation sub-hole, the compressor assembly includes a support plate provided at a bottom of the compressor, the compressor anticollision structure includes a fixation assembly, the fixation assembly includes a bolt member, a cushion pad, and a lock member, the bolt member includes a rod body and a position-limiting head connected to a bottom of the rod body, the rod body is connected to the installation sub-hole by an interference fit, and the position-limiting head is connected to the non-circular sub-hole by a stopping fit, the cushion pad is sleeved outside the rod body, and the support plate is sleeved outside the cushion pad and is spaced apart from the bolt member, and the lock member is connected to the rod body and is provided at a top side of the cushion pad.

In an embodiment, the rod body includes a knurling section, a bare section, and a thread section, the bare section is located between the knurling section and the thread section, and the knurling section passes through the installation sub-hole and is connected to the installation sub-hole by an interference fit, the cushion pad is sleeved outside the bare section, and the lock member is threadedly connected to the thread section.

In an embodiment, the stepped hole passes through the chassis, and the bolt member passes from a bottom side of the chassis to the stepped hole.

In an embodiment, the lock member is spaced apart from the cushion pad along an axial direction of the bolt member, to make the cushion pad have a free movement stroke along an axial direction of the cushion pad.

In an embodiment, the lock member includes a nut and a gasket, an abutment surface away from the bare section is formed in a junction between the thread section and the bare section, and the nut is threadedly connected to the thread section and abuts the gasket on the abutment surface.

In an embodiment, the cushion pad includes a first axis hole and a second axis hole communicated with each other, the first axis hole is located at a bottom side of the second axis hole, and a hole diameter of the first axis hole is less than a hole diameter of the second axis hole, and the bare section passes through the first axis hole and the second axis hole.

In an embodiment, the compressor anticollision structure further includes a surrounding plate, the surrounding plate protrudes from a top surface of the chassis and surrounds the installation sub-hole to enclose a limiting space communicated with the installation sub-hole, and a bottom of the cushion pad is located in the limiting space.

The present disclosure further provides an electrical device, including any one of the compressor anticollision structures as mentioned above.

Embodiments of the present disclosure provides a compressor anticollision structure. When the compressor shakes violently, the anticollision strip can prevent the compressor from hitting the external components and/or other internal components of the electrical device. In this case, the probability of the compressor hitting the external components and/or other internal components of the electrical device can be greatly reduced, which can improve the product quality of the electrical device.

DETAILED DESCRIPTION OF THE EMBODIMENTS

It should be noted that, on the premise of no conflict, embodiments in the present disclosure and the technical features in the embodiments can be combined with each other. The detailed descriptions in the embodiments should be understood as explanations for the purpose of the present disclosure, and should not be regarded as improper limitations to the present disclosure.

5

Figure 1:
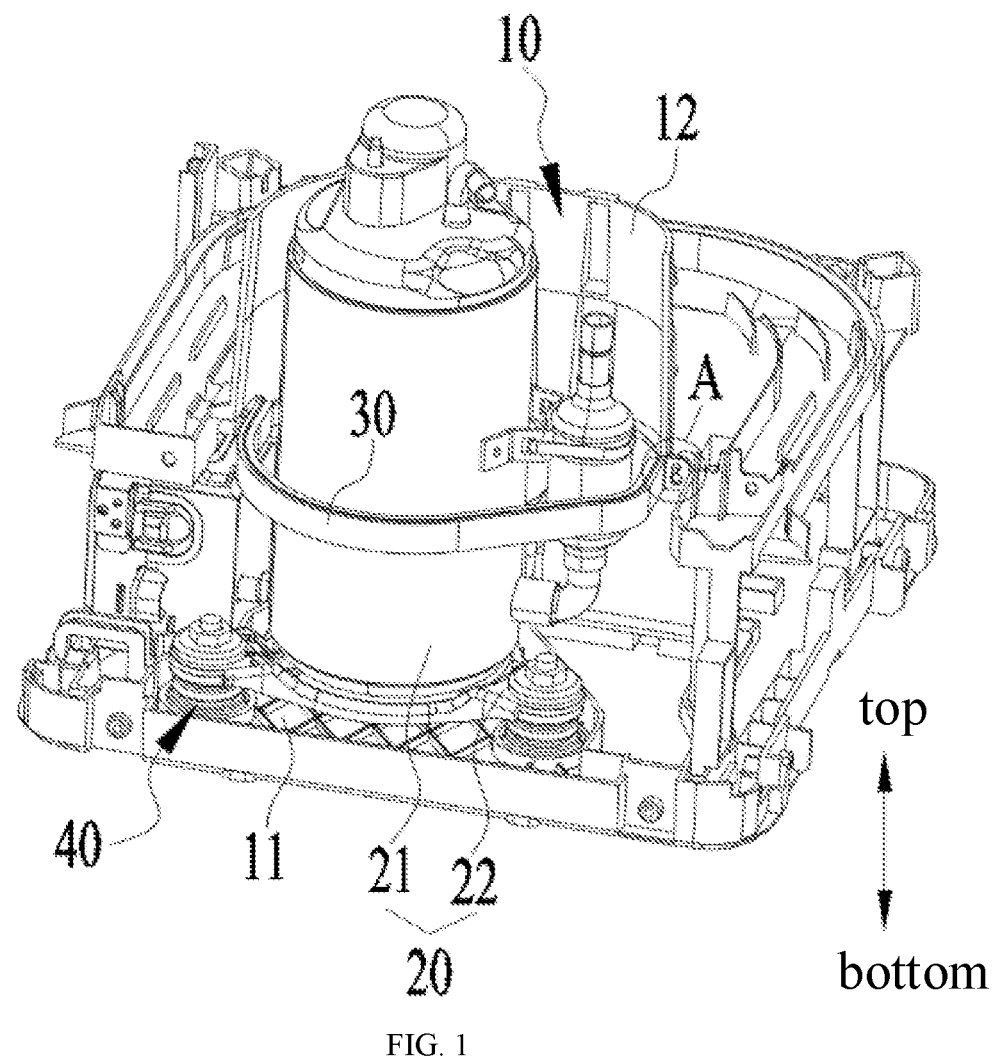
FIG. 1 is a schematic structure view of a compressor anticollision structure from a perspective according to an embodiment of the present disclosure.

In the description of the present disclosure, the orientations or the positional relationships "top" and "bottom" are based on FIG. 1. The orientation or the positional relationship "lateral" is based on the orientation or positional relationship shown in FIG. 4. The "height" refers to a direction from top to bottom in FIG. 1. It should be understood that these orientation terms are only for the convenience of describing the present disclosure and simplifying the description, rather than indicating or implying that the device or the component must have a specific orientation, or be configured in a specific orientation and operated, and should not be understood as a limitation to the present disclosure.

Figure 4:
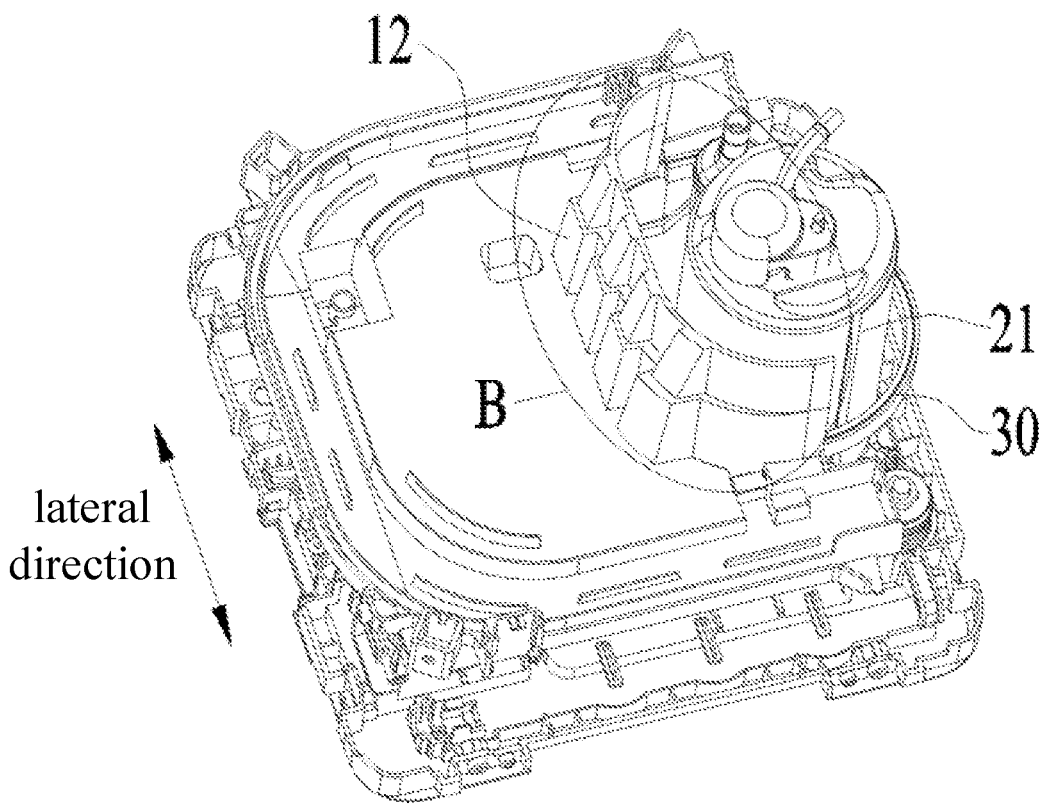
FIG. 4 is a schematic structure view of the compressor anticollision structure in FIG. 1 from another perspective.

An embodiment of the present disclosure provides a compressor anticollision structure, applied in an electrical device. As shown in FIG. 1 and FIG. 4, the compressor anticollision structure includes a support assembly 10, a compressor assembly 20, and an anticollision strip 30. The support assembly 10 includes a chassis 11. The compressor assembly 20 is provided at the chassis 11 and includes a compressor 21. The anticollision strip 30 is connected to the support assembly 10, and a head end of the anticollision strip 30 is connected to a tail end of the anticollision strip 30 to surround a periphery of the compressor 21. Or, two opposite ends in a length direction of the anticollision strip 30 are respectively connected to the support assembly 10, and the compressor 21 is located in an area enclosed by the anticollision strip 30 and the support assembly 10.

In some embodiments, a head end of the anticollision strip 30 is connected to a tail end of the anticollision strip 30 to form an annular structure. The anticollision strip 30 in the annular structure surrounds the periphery of the compressor 21. When the electrical device shakes violently or falls down and causes the compressor 21 to shake violently, the anticollision strip 30 can prevent the compressor 21 from hitting the external components and/or other internal components of the electrical device. In other embodiments, two opposite ends in a length direction of the anticollision strip 30 are respectively connected to the support assembly 10, to enclose an area in which the compressor 21 can be protected. The compressor 21 is located in the area, and when the compressor 21 shakes violently, the peripheral anticollision strip 30 of the compressor 21 or the support assembly 10 can prevent the compressor 21 from hitting the external components and/or other internal components of the electrical device.

Another embodiment of the present disclosure provides an electrical device, including the compressor anticollision structure in any embodiment of the present disclosure.

The electrical device, which has a compressor 21, may be a dehumidifier, an air conditioner outdoor unit, or a refrigerator, and the like.

The anticollision strip 30 is connected to the support assembly 10, which can prevent the compressor 21 from hitting the external components and/or other internal components of the electrical device when the compressor 21 shakes violently. In this case, the probability of the compressor 21 hitting the external components and/or other internal components of the electrical device can be greatly reduced, which can improve the product quality of the electrical device.

The anticollision strip 30 can be connected to the support assembly 10 in many ways. For example, as shown in FIG. 1 and FIG. 4, two opposite ends in a length direction of the anticollision strip 30 are respectively connected to the support assembly 10. In an embodiment, the support assembly 10 includes a middle partition 12 provided at the chassis 11, and two opposite ends in a length direction of the anticollision strip 30 are respectively connected to the middle partition 12. The middle partition 12 is mainly used for separating the compressor 21 from part internal components of the electrical device. For example, the middle partition 12 separates the compressor 21 from the air flue, the water tank and other components. That is to say, the middle partition 12 can prevent the compressor 21 from hitting the internal components on the side of the middle partition 12 away from the compressor 21. Two opposite ends in a length direction of the anticollision strip 30 are respectively connected to the middle partition 12. In this way, a ring of protective structure may be formed in the periphery of the compressor 21, which may prevent the compressor 21 from hitting the nearby external components or internal components.

It can be understood that in other embodiments, two opposite ends in a length direction of the anticollision strip 30 may not be connected to the middle partition 12. The support assembly 10 can further include the support plate, the support pillar, and other structures provided at the chassis 11. Two opposite ends in the length direction of the anticollision strip 30 may be connected to the support plate or the support pillar.

For the connection method that a head end of the anticollision strip 30 is connected to a tail end of the anticollision strip 30, the anticollision strip 30 may be connected to the middle partition 12, the support plate or the support pillar. In this case, the middle partition 12, the support plate or the support pillar are only used for fixing the anticollision strip 30, but not for enclosing an area with the anticollision strip 30 to hold the compressor 21.

Figure 2:
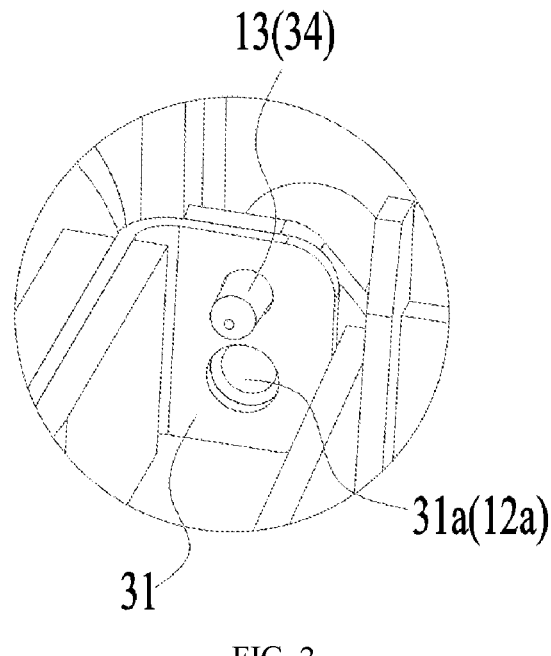
FIG. 2 is a partial enlarged view at A position in FIG. 1.
Figure 3:
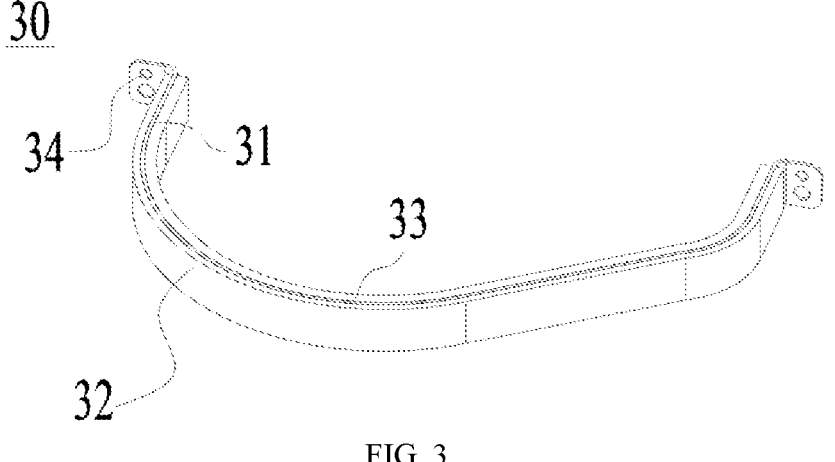
FIG. 3 is a schematic structure view of an anticollision strip in FIG. 1.

In an embodiment, as shown in FIGS. 1 to 3, the anticollision strip 30 includes a strip-shaped force-bearing body 31. The anticollision strip 30 is connected to the support assembly 10 through the strip-shaped force-bearing body 31. That is, two opposite ends in a length direction of the strip-shaped force-bearing body 31 may be connected to the middle partition 12, the support plate or the support pillar, to enclose an area for holding the compressor 21.

The strip-shaped force-bearing body 31 may be components such as a sheet metal component with certain strength and rigidity. As a main force structure of the anticollision strip 30, when the compressor 21 shakes violently and hits the anticollision strip 30, the strip-shaped force-bearing body 31 may bear the impact from the compressor 21.

In some embodiments, the anticollision strip 30 further includes a first flexible protection strip 32 provided at a side of the strip-shaped force-bearing body 31 away from the compressor 21. The first flexible protection strip 32 can be made of the polyethylene (PE) sponge, the rubber foam sponge, the silicone, and the like. In some cases, when hitting the external components or other internal components of the electrical device, the anticollision strip 30 is contacted to the external components or other internal components through the first flexible protection strip 32, which can play a cushion and protection role in preventing the external components or other internal components from damage.

In an embodiment, as shown in FIG. 3, the anticollision strip 30 can also include a second flexible protection strip 33 provided at a side of the strip-shaped force-bearing body 31 facing the compressor 21. The second flexible protection strip 33 can be made of the PE sponge, the rubber foam sponge, the silicone, and the like. The second flexible protection strip 33 can prevent the strip-shaped force-bearing body 31 from hitting the compressor 21 to cause damage to the compressor 21.

It can be understood that in an embodiment, a head end of the anticollision strip 30 is connected to a tail end of the anticollision strip 30 to surround a periphery of the compressor 21. The first flexible protection strip 32 is provided at a side of the strip-shaped force-bearing body 31 away from the compressor 21, and/or, the second flexible protection strip 33 is provided at a side of the strip-shaped force-bearing body 31 facing the compressor 21.

As shown in FIG. 1 and FIG. 2, in an embodiment, two opposite ends in a length direction of the strip-shaped force-bearing body 31 are respectively connected to the middle partition 12. The anticollision strip 30 further includes at least two first positioning members 34, and each of the two opposite ends in the length direction of the strip-shaped force-bearing body 31 is provided with at least one of the two first positioning members 34. The support assembly 10 further includes at least two second positioning members 13 provided at the middle partition 12. One of the first positioning member 34 and the second positioning member 13 is a positioning hole, and another of the first positioning member 34 and the second positioning member 13 is a positioning pillar. A positioning pillar is inserted in a corresponding positioning hole.

A fastener can be used for connecting each of the two opposite ends in a length direction of the strip-shaped force-bearing body 31 with the middle partition 12. For example, a screw can be used for fixing the middle partition 12 on each of the two opposite ends, and the positioning pillar can be plugged in a corresponding positioning hole before installing the screws. In this way, the first fastening connection hole 31*a* on the strip-shaped force-bearing body 31 can be aligned with the second fastening connection hole 12*a* on the middle partition 12, thereby improving the assembly efficiency of the anticollision strip 30.

Figure 5:
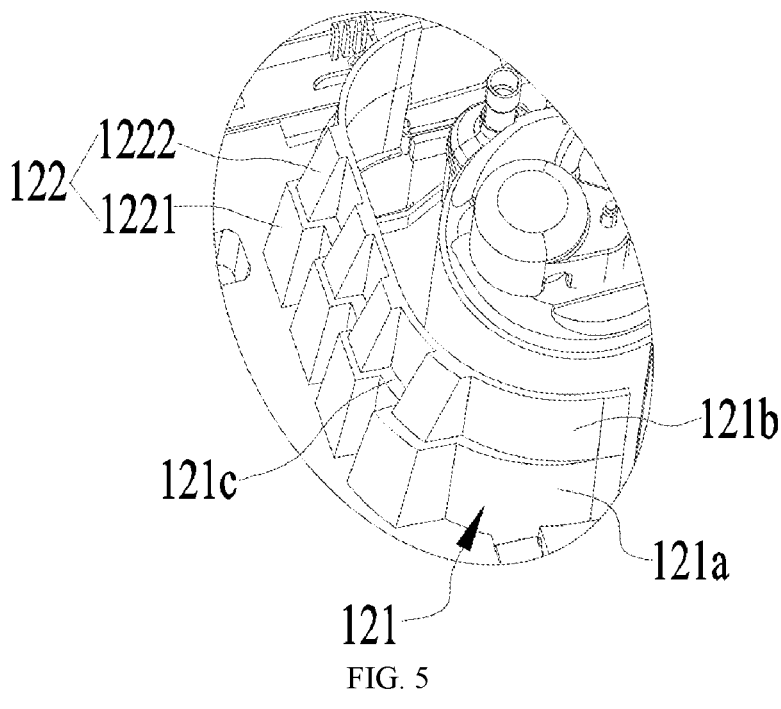
FIG. 5 is a partial enlarged view at B position in FIG. 4.

In an embodiment, as shown in FIG. 4 and FIG. 5, the middle partition 12 includes a plate body 121 and at least one enhanced boss 122 protruding from a side of the plate body 121 away from the compressor 21. That is, the number of the enhanced boss 122 may be one or more. The plate body 121 is provided at the chassis 11, and the enhanced boss 122 extends along a height direction of the plate body 121. The enhanced boss 122 may increase structural strength and rigidity of the middle partition 12, thereby preventing the compressor 21 from hitting and damaging the middle partition 12 during the shaking process of the compressor 21.

In addition, the size of the enhanced boss 122 in an embodiment of the present disclosure is relatively large. Therefore, a groove matching the shape of the enhanced boss 122 can be directly milled on the mold of the middle partition 12 during production. In this way, the mold processing method is simple and convenient, and the manufacturing cost of the mold can be saved, thereby reducing the production cost of the electrical device.

In an embodiment, as shown in FIG. 5, along a height direction of the middle partition 12, the middle partition 12 includes a first portion 121*a* and a second portion 121*b*. The second portion 121*b* is provided at a top side of the first portion 121*a*. A continuous stepped surface 121*c* is formed in a junction between a side of the first portion 121*a* away from the compressor 21 and a side of the second portion 121*a* away from the compressor 21, and the continuous stepped surface 121*c* extends along a lateral direction of the middle partition 12 and departs from the chassis 11. A part of the enhanced boss 122 is provided at the first portion 121*a* of the middle partition 12, and another part of the enhanced boss 122 is provided at the second portion 121*b* of the middle partition 12. That is, each enhanced boss 122 is divided into two sub-bosses. In order to facilitate description, the sub-boss close to the chassis 11 is the first sub-boss 1221, and the sub-boss provided at the top side of the first sub-boss 1221 is the second sub-boss 1222. A part of the continuous stepped surface 121*c* is located on the plate body 121, and another part of the continuous stepped surface 121*c* is located at a junction between the first sub-boss 1221 and the second sub-boss 1222. An outer wall of the second sub-boss 1222 away from the plate body 121 can be an inclined plane, to facilitate to arrange structures such as the air flue on the side of the second sub-boss 1222 away from the plate body 121. In this way, not only the structural rigidity of the middle partition 12 can be further improved, but also the internal structure of the electrical device can be more compact.

The number of the enhanced bosses 122 is not limited, which can be one or more. In an embodiment, the number of the enhanced bosses 122 may be multiple, and multiple enhanced bosses 122 are distributed at intervals along a lateral direction of the plate body 121. In this case, the structural strength and rigidity of the middle partition 12 can be further improved.

Figure 6:
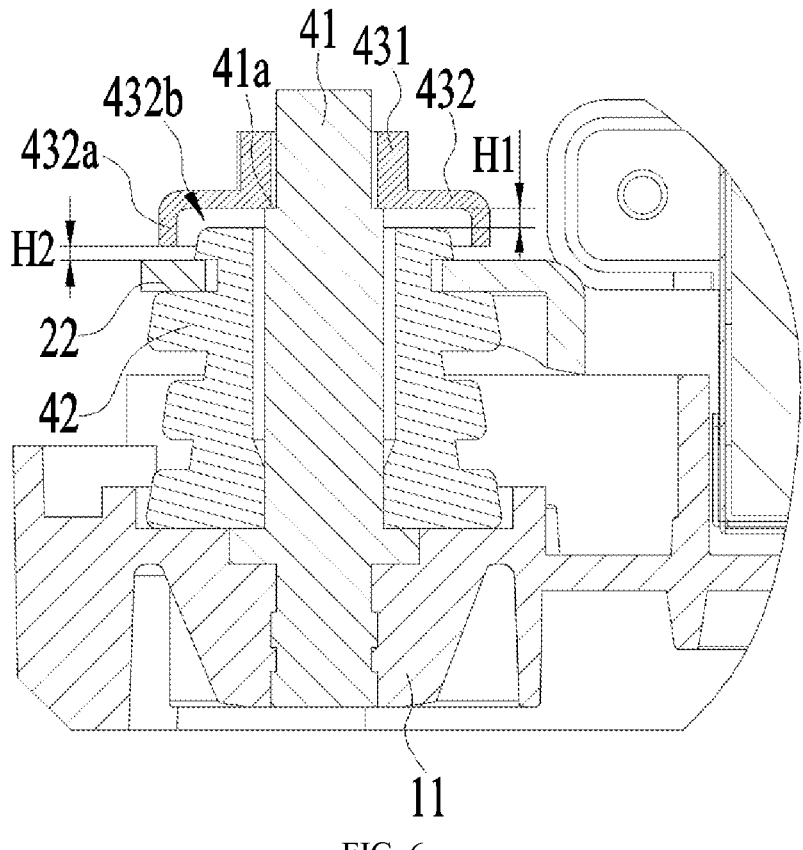
FIG. 6 is a sectional view showing connection relationships between a fixation assembly, a chassis, and a support plate in FIG. 1.

In an embodiment, as shown in FIG. 1 and FIG. 6, the compressor assembly 20 further includes a support plate 22 at a bottom of the compressor 21, and the compressor anticollision structure includes a fixation assembly 40. The number of the support plates 22 may be one or more. The number of the fixation assemblies 40 is the same as the number of the support plates 22. The fixation assembly 40 includes a support pillar 41 and a cushion pad 42, and a bottom of the support pillar 41 is connected to the chassis 11. The cushion pad 42 is sleeved outside the support pillar 41. The support plate 22 is sleeved outside the cushion pad 42 and is spaced apart from the support pillar 41. A top of the cushion pad 42 has a free movement stroke along an axial direction of the cushion pad 42. When compressed 21 shakes, the top of the cushion pad 42 may move along the axial direction of the cushion pad 42. Driven by the cushion pad 42, the support plate 22 on the cushion pad 42 may move together with the cushion pad 42, so that the cushion pad 42 can play a cushion role for the compressor 21.

There are many ways to make the top of the cushion pad 42 have a free movement stroke. In an embodiment, as shown in FIG. 6, a bottom of the cushion pad 42 is engaged with the support pillar 41 by an interference fit, and a top of the cushion pad 42 is engaged with the support pillar 41 by a loose fit. That is, the bottom of the cushion pad 42 is fastened to the support pillar 41. When the compressor 21 shakes, the top of the cushion pad 42 can move along the axial direction of the cushion pad 42 on the support pillar 41, and the bottom of the cushion pad 42 cannot move. In some embodiments, the bottom of the cushion pad 42 may be fastened to the chassis 11, and the top of the cushion pad 42 may be engaged with the support pillar 41 in a loose fit, as long as the top of the cushion pad 42 has a free movement stroke along an axial direction of the cushion pad 42.

In an embodiment, as shown in FIG. 6, the fixation assembly 40 may further include a gasket 432 and a nut 431 threadedly connected to the support pillar 41. The cushion pad 42 is located between the chassis 11 and the gasket 432, and an abutment surface 41*a* is formed at the support pillar 41. The nut 431 abuts the gasket 432 on the abutment surface 41*a*. Along an axial direction of the support pillar 41, the gasket 432 is spaced apart from the cushion pad 42 and the support plate 22, to make the top of the cushion pad 42 have the free movement stroke along the axial direction of the cushion pad 42.

In some cases, such as the electrical device shakes violently or falls down during transportation and the compressor 21 shakes violently, the cushion pad 42 will move along an axial direction of the cushion pad 42 in a large range. When the top of the cushion pad 42 moves to the limiting position along the axial direction close to the gasket 432, the cushion pad 42 abuts against the gasket 432. That is, the gasket 432 can limit the cushion pad 42, to limit the top of the cushion pad 42 within a certain range.

In an embodiment, as shown in FIG. 6, a minimum distance H1 between the cushion pad 42 and the gasket 432 is 0.5 mm to 3 mm along an axial direction of the support pillar 41. Within this distance range, the cushion pad 42 may play a better cushion and damping role, and it can be avoided that the movement range of the top of the cushion pad 42 along the axial direction becomes too large to make the shaking range of the compressor 21 increased.

Figure 7:
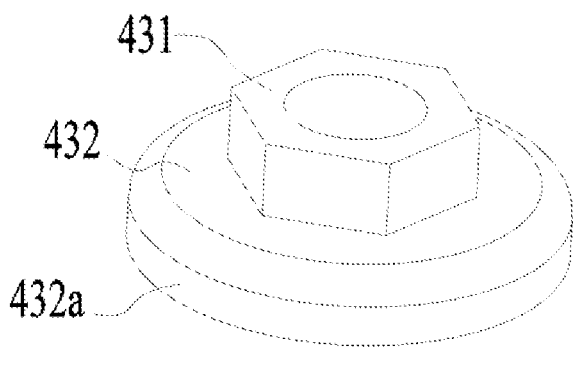
FIG. 7 is a schematic structure view of a nut and a gasket according to a first embodiment of the present disclosure.
Figure 8:
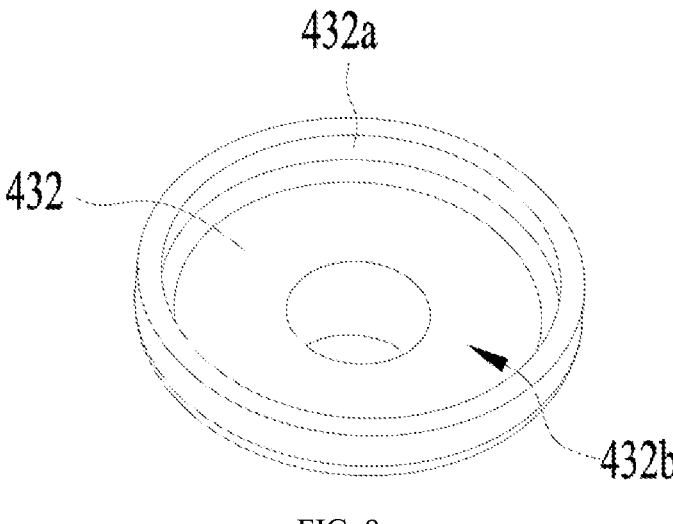
FIG. 8 is a schematic view of the structure in FIG. 7 from another perspective.
Figure 9:
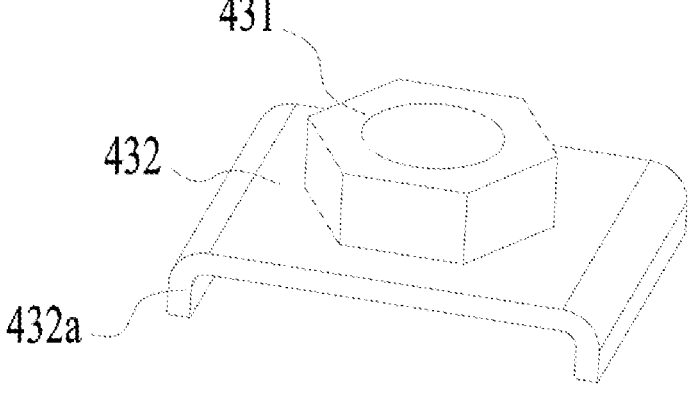
FIG. 9 is a schematic view of the nut and the gasket according to a second embodiment of the present disclosure.
Figure 10:
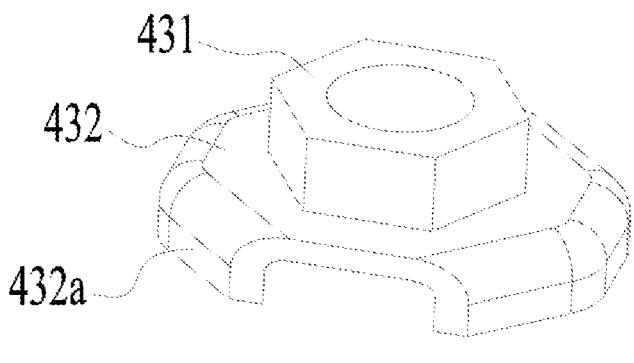
FIG. 10 is a schematic view of the nut and the gasket according to a third embodiment of the present disclosure.
Figure 11:
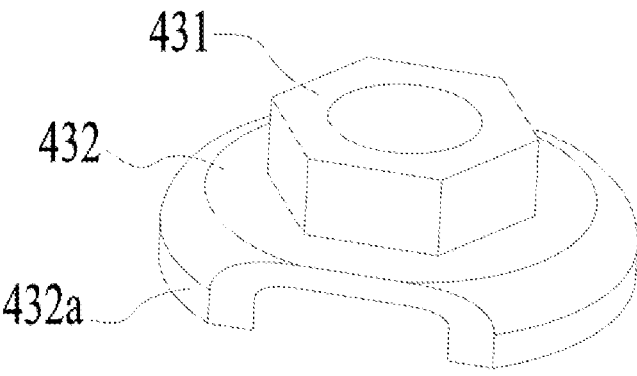
FIG. 11 is a schematic view of the nut and the gasket according to a fourth embodiment of the present disclosure.
Figure 12:
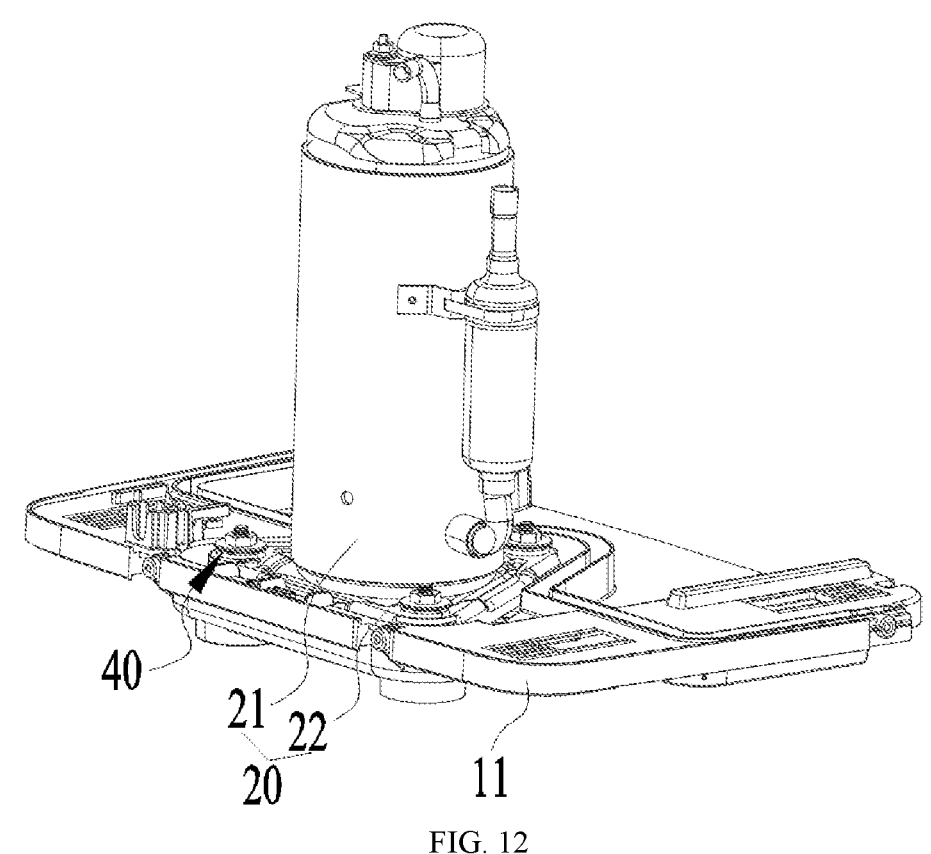
FIG. 12 is a structure view of the compressor anticollision structure according to another embodiment of the present disclosure, in this view the middle partition and the anticollision strip are omitted.
Figure 13:
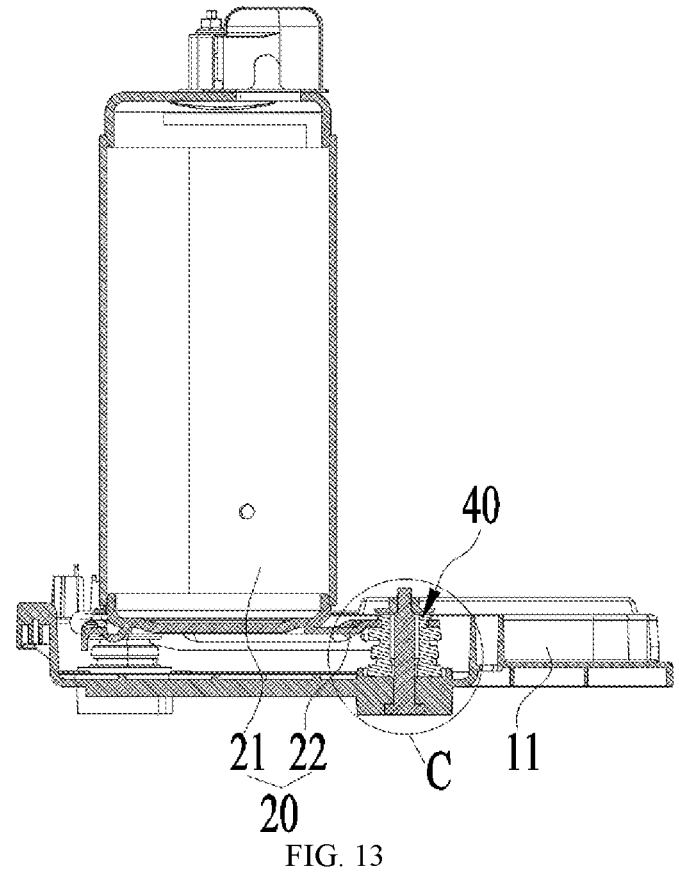
FIG. 13 is a sectional view of the compressor anticollision structure in FIG. 12.

In an embodiment, as shown in FIG. 6 to FIG. 8, the nut 431 and the gasket 432 form an integrated structure. That is, the nut 431 and the gasket 432 are integrated together. In this way, not only the assembly efficiency can be improved, but also the nut 431 and the gasket 432 can be prevented from rubbing against each other to produce an abnormal noise when the electrical device is operating.

As shown in FIG. 7 to FIG. 11, the gasket 432 may be shaped in a circle, a rectangular, a polygon, or an anomalous shape, which will not be limited here.

The specific structure of the gasket 432 is not limited. For example, the gasket 432 may be shaped in a plate, a curved plate, and the like.

In other embodiments, the nut 431 and the gasket 432 may be separated structures fastened to each other. For example, the nut 431 and the gasket 432 can be connected together by welding.

In an embodiment, as shown in FIG. 6 to FIG. 8, a folded edge 432a folding towards the chassis 11 is formed at the gasket 432, and an accommodation space 432b is enclosed by the folded edge 432a. An end of the cushion pad 42 away from the chassis 11 extends into the accommodation space 432b, and the folded edge 432a is configured to face the support plate 22. When the electrical device shakes violently or falls down, the folded edge 432a can press the support plate 22, to avoid a too large shaking range of the compressor 21. In this way, the possibility of the compressor 21 hitting the external components and/or other internal components can be further reduced.

In an embodiment, as shown in FIG. 6, a distance H2 between a bottom surface of the folded edge 432a and a top surface of the support plate 22 is 0.5 mm to 3 mm. Within this distance range, a normal shaking range of the compressor 21 can be ensured to play a better cushion and damping role, and the compressor 21 can be better protected under the abnormal shaking condition.

In an embodiment, as shown in FIG. 12 to FIG. 19, a stepped hole 11a is formed at the chassis 11. The stepped hole 11a includes an installation sub-hole 11b and a non-circular sub-hole 11c at a bottom side of the installation sub-hole 11b. The compressor assembly 20 includes a support plate 22 provided at a bottom of the compressor 21. The compressor anticollision structure includes a fixation assembly 40, and the fixation assembly 40 includes a bolt member 41', a cushion pad 42, and a lock member 43. The bolt member 41' includes a rod body 411 and a position-limiting head 412 connected to a bottom of the rod body 411. The rod body 411 is connected to the installation sub-hole 11b by an interference fit, and the position-limiting head 412 is connected to the non-circular sub-hole 11c by a stopping fit. The cushion pad 42 is sleeved outside the rod body 411. The support plate 22 is sleeved outside the cushion pad 42 and is spaced apart from the bolt member 41'. The lock member 43 is connected to the rod body 411 and is provided at a top side of the cushion pad 42.

The cushion pad 42 can play a cushion role on the compressor 21, and the lock member 43 can limit the cushion pad 42. In this way, when the electrical device shakes violently or falls down, it can be avoided that the movement range of the cushion pad 42 along the axial direction becomes too large to make the shaking range of the compressor 21 increased.

During the assembly process, when the lock member 43 is screwed by the operator, the position-limiting head 412 is connected to the non-circular sub-hole 11c by a stopping fit. In this case, the bolt member 41' can be prevented from rotating with the lock member 43, so that the lock member 43 can be screwed up. The rod body 411 is connected to the installation sub-hole 11b by an interference fit, which can make the bolt member 41' connected to the chassis 11 tightly. That is, in the compressor anticollision structure of the embodiments of the present disclosure, the lock member 43 can be locked on the bolt member 41', and the bolt member 41' can be connected to the chassis 11 tightly. When the electrical device shakes violently or falls down, the bolt member 41' and/or the lock member 43 are difficult to be loose. In this case, the compressor 21 can be fastened to the chassis 11 without a large shaking range, which can greatly reduce the possibility of the compressor 21 hitting the external components or other internal components.

In the embodiment of the present disclosure, the number of the support plates 22 may be one or more. The number of the fixation assemblies 40 can be adjusted according to the number of the support plates 22, as long as each support plate 22 can be connected to a corresponding fixation assemblies 40 respectively.

The non-circular sub-hole 11c on the chassis 11 can be shaped in a polygon, a semi-circular, an oval, or an anomalous shape, as long as the non-circular sub-hole 11c can prevent the position-limiting head 412 from rotating.

In an embodiment, as shown in FIG. 12 to FIG. 19, the rod body 411 includes a knurling section 411a, a bare section 411b, and a thread section 411c. The bare section 411b is located between the knurling section 411a and the thread section 411c. The knurling section 411a passes through the installation sub-hole 11b and is connected to the installation sub-hole 11b by the interference fit. The cushion pad 42 is sleeved outside the bare section 411b, and the lock member 43 is threadedly connected to the thread section 411c.

The knurling section 411a on the bolt member 41' may help increase the contact area and friction between the bolt member 41' and a corresponding side wall of the installation sub-hole 11b, to make the bolt member 41' connected to the chassis 11 more tightly. The bare section 411b may reduce the friction between the bolt member 41' and the cushion pad 42, so that the cushion pad 42 can play a cushion and damping role on the compressor 21 by stretching out and drawing back along the axial direction. In addition, the structure of the bolt member 41' is simple, and easy to process. In this case, not only the reliability of the bolt member 41' can be improved, but also the manufacturing cost of the bolt member 41' can be saved.

The pattern on the knurling section 411*a* of the bolt member 41' may be straight lines or a mesh, as long as the knurling section 411*a* can be connected to the installation sub-hole 11*b* by an interference fit.

In an embodiment, as shown in FIG. 13 to FIG. 18, the stepped hole 11*a* passes through the chassis 11, and the bolt member 41' passes from a bottom side of the chassis 11 to the stepped hole 11*a*.

In an embodiment of the present disclosure, the chassis 11 may be an injection molding component. The bolt member 41' may be assembled on the chassis 11 in many ways. For example, when the chassis 11 is not completely cooled after injection molding, the bolt member 41' may be pressed from a bottom side of the chassis 11 into the stepped hole 11*a* through a tool. After the chassis 11 is completely cooled, due to thermal expansion and contraction of the chassis 11, the knurling section 411*a* on the bolt member 41' can be connected to the installation sub-hole 11*b* by the interference fit. For another example, after the chassis 11 is completely cooled, the bolt member 41' is heated, and the heated bolt member 41' can be pressed from the bottom side of the chassis 11 into the stepped hole 11*a* through the tool. After the bolt member 41' is completely cooled, the knurling section 411*a* on the bolt member 41' can be connected to the installation sub-hole 11*b* by the interference fit. The bolt member 41' can be assembled easily in both above two ways.

In other embodiments, the chassis 11 can be injected on the bolt member 41'. The knurling section 411*a* on the bolt member 41' and the position-limiting head 412 can be put in the injection mold of the chassis 11 in advance. When the injection molding of the chassis 11 is finished, the bolt member 41' is integrated with the chassis 11.

In an embodiment, as shown in FIGS. 14 to 20, the lock member 43 is spaced apart from the cushion pad 42 along an axial direction of the bolt member 41', to make the cushion pad 42 have a free movement stroke along the axial direction of the cushion pad 42.

When the electrical device shakes violently or falls down, the cushion pad 42 can move on the bare section 411*b* of the bolt member 41' along the axial direction of the cushion pad 42. Driven by the cushion pad 42, the support plate 22 sleeved outside the cushion pad 42 can move with the cushion pad 42 together, thereby improving the cushion and damping effect of the cushion pad 42.

Figures 14, 15:
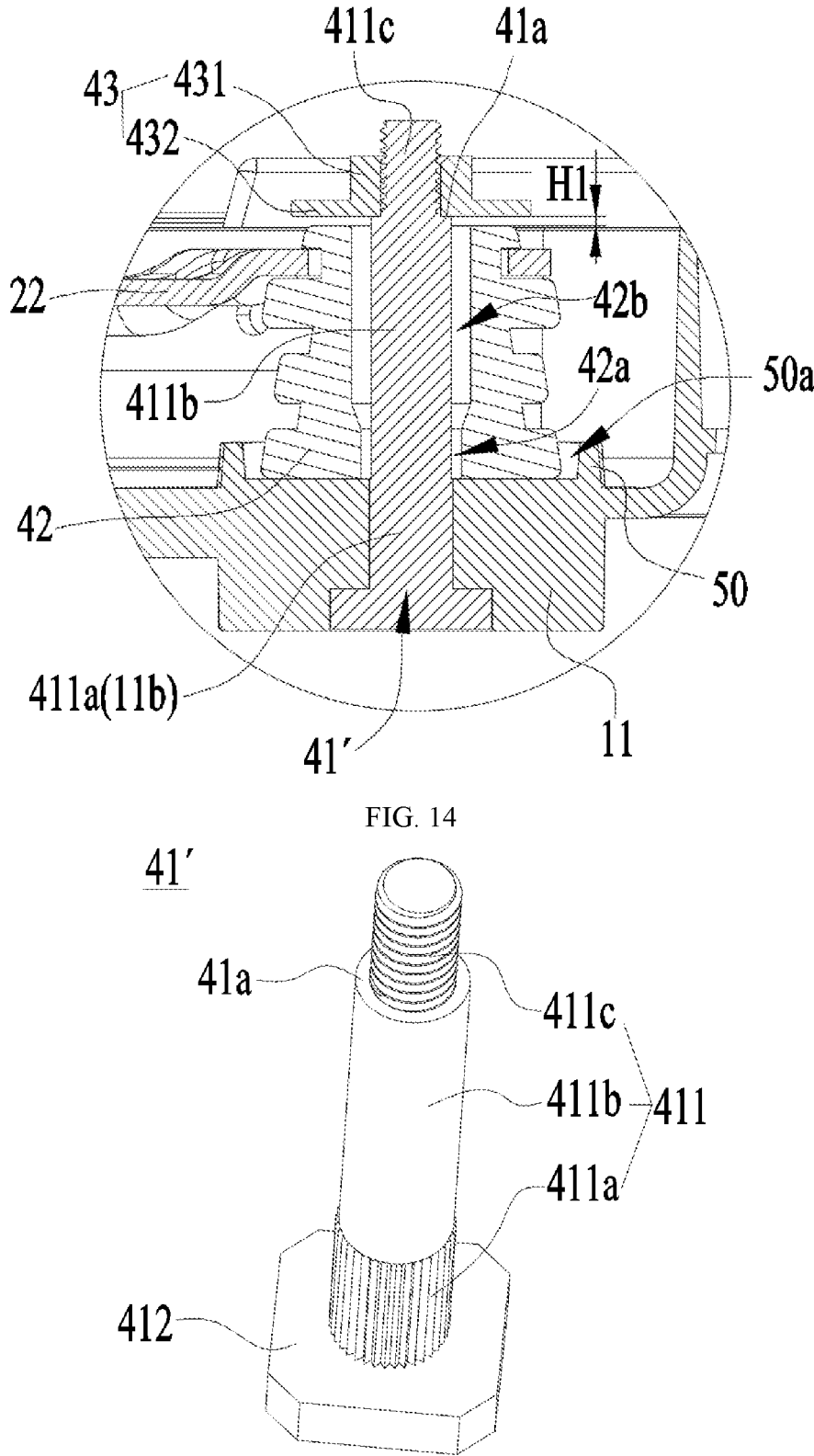
FIG. 14 is an enlarged view at C position in FIG. 13.
FIG. 15 is a structure view of a bolt member in FIG. 14.
Figure 16:
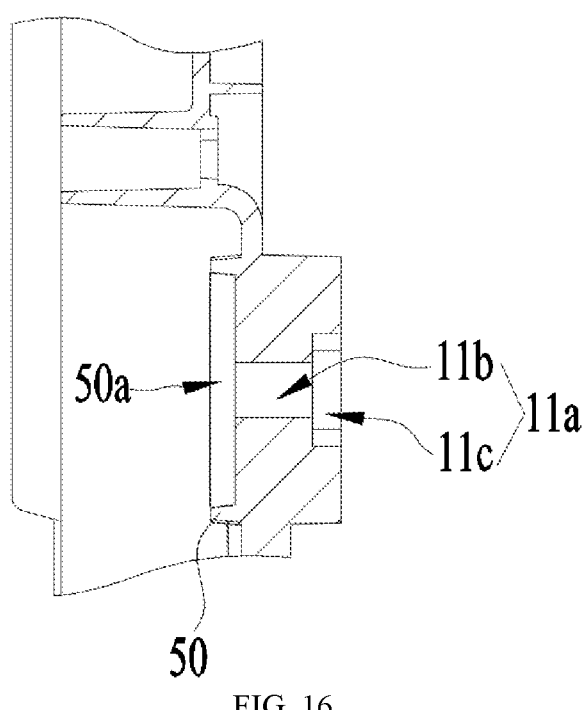
FIG. 16 is a sectional view of partial structures of the chassis in FIG. 14, mainly showing a stepped hole, a surrounding plate, and a limiting space.
Figure 17:
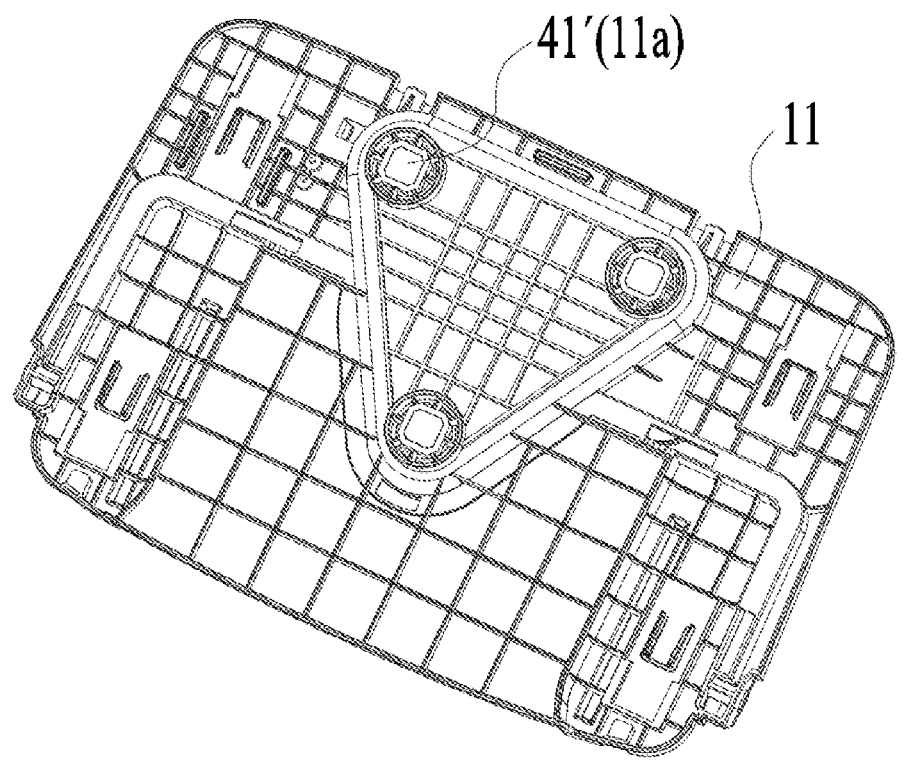
FIG. 17 is a schematic view showing a matching relationship between the bolt member and the chassis in FIG. 14 from a perspective, in this view the bottom surface of the chassis is shown.
Figure 18:
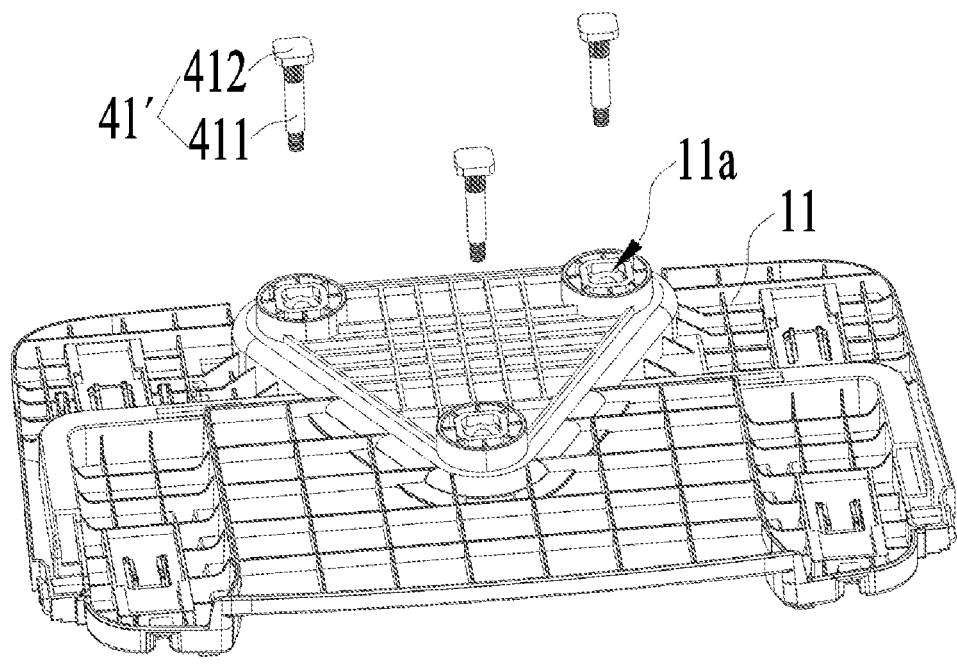
FIG. 18 is an exploded view of the structure in FIG. 17.
Figure 19:
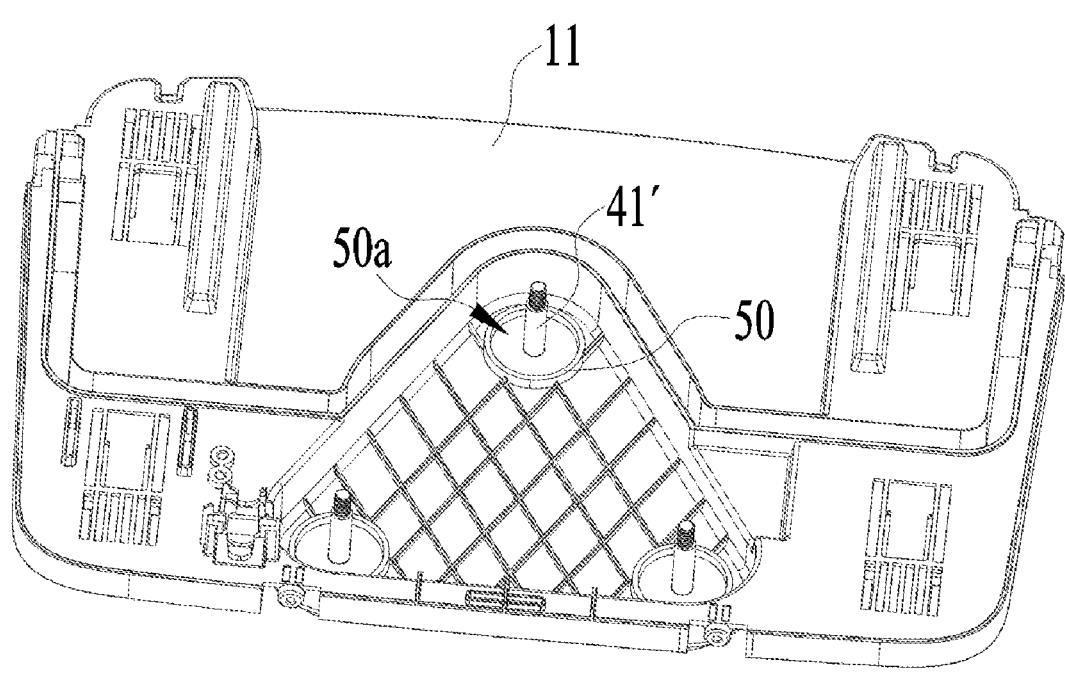
FIG. 19 is a schematic view showing a matching relationship between the bolt member and the chassis in FIG. 14 from another perspective, in this view the top surface of the chassis is shown.
Figure 20:
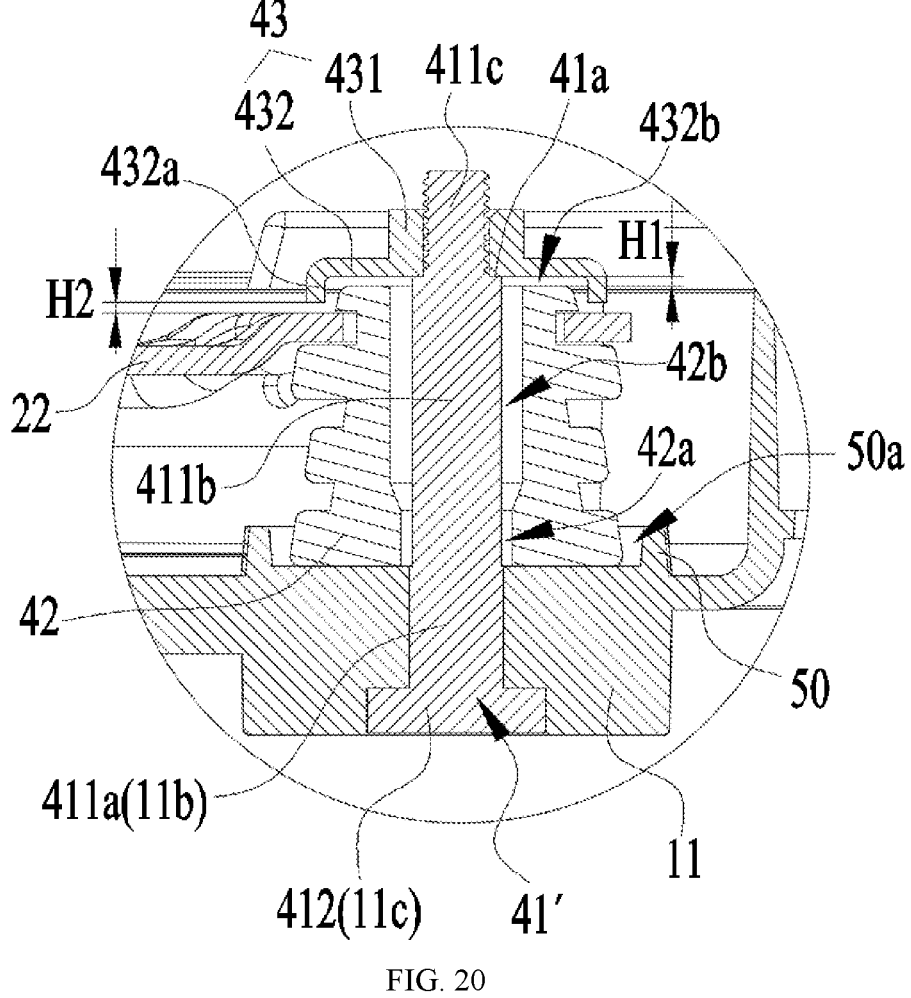
FIG. 20 is a sectional view of a fixation assembly according to another embodiment of the present disclosure.

In an embodiment, as shown in FIG. 14, FIG. 15 and FIG. 20, the lock member 43 may include a nut 431 and a gasket 432. An abutment surface 41*a* away from the bare section 411*b* is formed in a junction between the thread section 411*c* and the bare section 411*b*. The nut 431 is threadedly connected to the thread section 411*c* and abuts the gasket 432 on the abutment surface 41*a*. That is, through the gasket 432, the lock member 43 may limit the cushion pad 42, thereby limiting the cushion pad 42 within a certain movement range.

It can be understood that in some embodiments, the lock member 43 can only have a nut 431 without the gasket 432, and the nut 431 can be spaced apart from the cushion pad 42 to limit the cushion pad 42 within a certain range.

In other embodiments, the lock member 43 may not be spaced apart from the cushion pad 42. For example, the lock member 43 can contact to the cushion pad 42, or the lock member 43 can abut against the cushion pad 42 tightly.

In an embodiment, as shown in FIG. 14 and FIG. 20, the cushion pad 42 includes a first axis hole 42*a* and a second axis hole 42*b* communicated with each other. The first axis hole 42*a* is located at a bottom side of the second axis hole 42*b*, and a hole diameter of the first axis hole 42*a* is less than a hole diameter of the second axis hole 42*b*. The bare section 411*b* passes through the first axis hole 42*a* and the second axis hole 42*b*.

The cushion pad 42 is generally made of elastic materials, and the specifications of the bolt member 41' may be different according to different models of the electrical device. For example, the bolt member 41' with a diameter of 8 mm on the bare section 411*b* is required in the electrical device A, and the bolt member 41' with a diameter of 10 mm on the bare section 411*b* is required in the electrical device B, in this case, the hole diameter of the first axis hole 42*a* can be about 8 mm, and the second axis hole 42*b* can be about 10 mm. After the bolt member 41' with a diameter of 8 mm on the bare section 411*b* passes through the first axis hole 42*a* and the second axis hole 42*b*, the first axis hole 42*a* can be engaged with the bare section 411*b*. After the bolt member 41' with a diameter of 10 mm on the bare section 411*b* passes through the first axis hole 42*a* and the second axis hole 42*b*, the second axis hole 42*b* can be engaged with the bare section 411*b*. In addition, through elastic deformation, the cushion foot pad 42 enables the bare section 411*b* to match with the first axis hole 42*a* by the interference fit. That is, the first axis hole 42*a* and the second axis hole 42*b* with different hole diameters enable the cushion foot pad 42 to match with the bolt member 41' with different diameters on the bare section 411*b*. In this way, the universality of the cushion foot pad 42 can be improved.

In an embodiment, as shown in FIG. 14, FIG. 16, FIG. 19 and FIG. 20, the compressor anticollision structure further includes a surrounding plate 50. The surrounding plate 50 protrudes from a top surface of the chassis 11 and surrounds the installation sub-hole 11*b* to enclose a limiting space 50*a* communicated with the installation sub-hole 11*b*. A bottom of the cushion pad 42 is located in the limiting space 50*a*. The surrounding plate 50 can limit the cushion pad 42, to avoid a too large deviation along the radial direction of the cushion pad 42 when the compressor 21 shakes.

The degree of the surrounding plate 50 protruding from the top surface of the chassis 11 is not limited, as long as the cushion pad 42 can be limited and is not interfered with other components.

The surrounding plate 50 and the chassis 11 can be integrated. For example, the surrounding plate 50 and the chassis 11 can be integrated by injection molding. The surrounding plate 50 can be connected to the chassis 11 through fasteners such as the screws, which will not be limited here.

Embodiments provided in the present disclosure can be combined with each other without contradictory.

The above are only some embodiments of the present disclosure, and do not limit the scope of the present disclosure thereto. For those skilled in the art, various modifications and changes may be made to the present disclosure. Under the inventive concept of the present disclosure, any modifications, equivalent replacements, improvements, etc., fall within the scope of the present disclosure.

What is claimed is:

1. A compressor anticollision structure comprising:
   a support assembly including a chassis;
   a compressor assembly provided at the chassis and including a compressor;
   an anticollision strip connected to the support assembly; and
   a fixation assembly including a bolt member, a cushion pad, and a lock member;
   wherein:

13 a head end of the anticollision strip is connected to a tail end of the anticollision strip to surround the compressor, or two opposite ends in a length direction of the anticollision strip are connected to the support assembly, and the compressor is located in an area enclosed by the anticollision strip and the support assembly;

the anticollision strip includes:

a strip-shaped force-bearing body; and a flexible protection strip provided at a side of the strip-shaped force-bearing body away from the compressor;

a stepped hole is formed at the chassis, the stepped hole including an installation sub-hole and a non-circular sub-hole at a bottom side of the installation sub-hole;

the compressor assembly further includes a support plate provided at a bottom of the compressor;

the bolt member includes:

a rod body connected to the installation sub-hole by an interference fit; and a position-limiting head connected to a bottom of the rod body, the position-limiting head being connected to the non-circular sub-hole by a stopping fit;

the cushion pad is sleeved outside the rod body, and the support plate is sleeved outside the cushion pad and is spaced apart from the bolt member;

the lock member is connected to the rod body and is provided at a top side of the cushion pad;

the rod body includes a knurling section, a bare section, and a thread section;

the bare section is located between the knurling section and the thread section; and the knurling section passes through the installation sub-hole and is connected to the installation sub-hole by an interference fit, the cushion pad is sleeved outside the bare section, and the lock member is threadedly connected to the thread section.

2. The compressor anticollision structure of claim 1, wherein:

the flexible protection strip is a first flexible protection strip, and the anticollision strip further includes a second flexible protection strip provided at a side of the strip-shaped force-bearing body facing the compressor.

3. The compressor anticollision structure of claim 1, wherein:

the support assembly includes a middle partition provided at the chassis, and two opposite ends in a length direction of the strip-shaped force-bearing body are fastened to the middle partition;

the anticollision strip further includes a first positioning member provided at one of the two opposite ends in the length direction of the strip-shaped force-bearing body;

the support assembly further includes a second positioning members provided at the middle partition, and one of the first positioning member and the second positioning member is a positioning hole, another of the first positioning member and the second positioning member is a positioning pillar, and the positioning pillar is inserted in the positioning hole.

4. The compressor anticollision structure of claim 1, wherein:

the support assembly includes a middle partition provided at the chassis, and the middle partition includes:

a plate body provided at the chassis; and

an enhanced boss protruding from a side of the plate body away from the compressor and extending along a height direction of the plate body.

5. The compressor anticollision structure of claim 4, wherein:

the middle partition includes a first portion and a second portion along a height direction of the middle partition, the second portion is provided at a top side of the first portion;

a continuous stepped surface is formed at a junction between a side of the first portion away from the compressor and a side of the second portion away from the compressor, the continuous stepped surface extending along a lateral direction of the middle partition and departing from the chassis; and a part of the enhanced boss is provided at the first portion of the middle partition, and another part of the enhanced boss is provided at the second portion of the middle partition.

6. The compressor anticollision structure of claim 1, wherein the lock member is spaced apart from the cushion pad along an axial direction of the bolt member, to allow a free movement stroke of the cushion pad along an axial direction of the cushion pad.

7. The compressor anticollision structure of claim 6, wherein:

the lock member includes a nut and a gasket;

an abutment surface away from the bare section is formed at a junction between the thread section and the bare section; and the nut is threadedly connected to the thread section and abuts the gasket on the abutment surface.

8. The compressor anticollision structure of claim 1, wherein:

the cushion pad includes a first axis hole and a second axis hole communicated with each other;

the first axis hole is located at a bottom side of the second axis hole, and a hole diameter of the first axis hole is less than a hole diameter of the second axis hole; and the bare section passes through the first axis hole and the second axis hole.

9. The compressor anticollision structure of claim 1, wherein the stepped hole passes through the chassis, and the bolt member passes from a bottom side of the chassis to the stepped hole.

10. The compressor anticollision structure of claim 1, further comprising:

a surrounding plate protruding from a top surface of the chassis and surrounding the installation sub-hole to enclose a limiting space communicated with the installation sub-hole, a bottom of the cushion pad being located in the limiting space.

11. An electrical device comprising the compressor anticollision structure of claim 1.

12. A compressor anticollision structure comprising:

a support assembly including a chassis;

a compressor assembly provided at the chassis and including a compressor; and an anticollision strip connected to the support assembly;

wherein:

a head end of the anticollision strip is connected to a tail end of the anticollision strip to surround the compressor, or two opposite ends in a length direction of the anticollision strip are connected to the support assembly, and the compressor is located in an area enclosed by the anticollision strip and the support assembly;

the support assembly includes a middle partition provided at the chassis;

the middle partition includes:

a plate body provided at the chassis; and an enhanced boss protruding from a side of the plate body away from the compressor and extending along a height direction of the plate body;

the middle partition includes a first portion and a second portion along a height direction of the middle partition, the second portion is provided at a top side of the first portion;

a continuous stepped surface is formed at a junction between a side of the first portion away from the compressor and a side of the second portion away from the compressor, the continuous stepped surface extending along a lateral direction of the middle partition and departing from the chassis; and a part of the enhanced boss is provided at the first portion of the middle partition, and another part of the enhanced boss is provided at the second portion of the middle partition.

13. A compressor anticollision structure comprising:

a support assembly including a chassis;

a compressor assembly provided at the chassis and including a compressor;

an anticollision strip connected to the support assembly; and a fixation assembly including a support pillar, a cushion pad, a gasket, and a nut threadedly connected to the support pillar, a bottom of the support pillar being connected to the chassis, the cushion pad being sleeved outside the support pillar, and the cushion pad being located between the chassis and the gasket;

wherein:

a head end of the anticollision strip is connected to a tail end of the anticollision strip to surround the compressor, or two opposite ends in a length direction of the anticollision strip are connected to the support assembly, and the compressor is located in an area enclosed by the anticollision strip and the support assembly;

the compressor assembly further includes a support plate at a bottom of the compressor;

the support plate is sleeved outside the cushion pad and is spaced apart from the support pillar;

a top of the cushion pad has a free movement stroke along an axial direction of the cushion pad;

an abutment surface is formed at the support pillar, and the nut abuts the gasket on the abutment surface; and the gasket is spaced apart from the cushion pad and the support plate along an axial direction of the support pillar, to allow the free movement stroke of the top of the cushion pad along the axial direction of the cushion pad.

* * * * *